(12) United States Patent
Vasseur

(10) Patent No.: US 7,920,466 B2
(45) Date of Patent: Apr. 5, 2011

(54) PROTECTION OF HIERARCHICAL TUNNEL HEAD-END NODES

(75) Inventor: Jean-Philippe Vasseur, Dunstable, MA (US)

(73) Assignee: Cisco Technology, Inc., San Jose, CA (US)

( * ) Notice: Subject to any disclaimer, the term of this patent is extended or adjusted under 35 U.S.C. 154(b) by 685 days.

(21) Appl. No.: 11/622,026

(22) Filed: Jan. 11, 2007

(65) Prior Publication Data

US 2008/0170493 A1 Jul. 17, 2008

(51) Int. Cl.
*G01R 31/08* (2006.01)

(52) U.S. Cl. ........................................................ 370/229

(58) Field of Classification Search .................. None
See application file for complete search history.

(56) References Cited

U.S. PATENT DOCUMENTS

| | | | |
|---|---|---|---|
| 6,778,492 B2 | 8/2004 | Charny et al. | |
| 6,895,441 B1 * | 5/2005 | Shabtay et al. | 709/238 |
| 6,978,394 B1 | 12/2005 | Charny et al. | |
| 2003/0126287 A1 | 7/2003 | Charny et al. | |
| 2003/0233595 A1 | 12/2003 | Charny et al. | |
| 2005/0083928 A1 | 4/2005 | Sivabalan et al. | |
| 2005/0097219 A1 | 5/2005 | Goguen et al. | |
| 2005/0259664 A1 | 11/2005 | Vasseur et al. | |
| 2006/0031490 A1 | 2/2006 | Provine et al. | |
| 2007/0091911 A1 * | 4/2007 | Watanabe et al. | 370/408 |

OTHER PUBLICATIONS

Awduche, D. et al., Request for Comments 3209, "RSVP-TE: Extensions to RSVP for LSP Tunnels", IETF, Network Working Group, Dec. 2001, pp. 1-57.
Smit, H. et al., Request for Comments 3784, "Intermediate System to Intermediate System (IS-IS) Extensions for Traffic Engineering (TE)", IETF, Network Working Group, Jun. 2004, pp. 1-13.
Katz, D. et al., Request for Comments 3630, "Traffic Engineering (TE) Extensions to OSPF Version 2", IETF, Network Working Group, Sep. 2003, pp. 1-14.
Braden, R. et al., Request for Comments 2205, "Resource ReSerVation Protocol (RSVP)—Version 1 Functional Specification", IETF, Network Working Group, Sep. 1997, pp. 1-105.
Vasseur, JP. et al., Internet Draft, "Path Computation Element (PCE) Communication Protocol (PCEP)-Version 1 (draft-ietf-pce-pcep-03.txt)", IETF, Network Working Group, Oct. 2006, pp. 1-61.
Berger, L., Request for Comments 3473, "Generalized Multi-Protocol Label Switching (GMPLS) Signalling Resource ReserVation Protocol-Traffic Engineering (RSVP-TE) Extensions", IETF, Network Working Group, Jan. 2003, pp. 1-40.

(Continued)

*Primary Examiner* — Chi H Pham
*Assistant Examiner* — Fan Ng
(74) *Attorney, Agent, or Firm* — Cesari and McKenna, LLP

(57) ABSTRACT

In one embodiment, a point of local repair (PLR) for a child tunnel establishes a backup tunnel to a hierarchical tunnel head-end node's (grooming node's) downstream hierarchical tunnel neighbor (merge point) and learns a corresponding backup tunnel label. The PLR then stores a label stack having at least i) the backup tunnel label, ii) a hierarchical tunnel label for the merge point, and iii) a child tunnel label as advertised by an hierarchical tunnel tail-end node. Upon failure of the grooming node, the PLR pushes the stored label stack onto traffic for the child tunnel, and reroutes the traffic with the pushed label stack onto the backup tunnel toward the merge point (e.g., so the merge point may receive the traffic with a proper/expected label stack).

27 Claims, 6 Drawing Sheets

OTHER PUBLICATIONS

Farrel, A. et al., Request for Comments 4420, "Encoding of Attributes for Multiprotocol Label Switching (MPLS) Label Switched Path (LSP) Establishment Using Resource ReserVation Protocol-Traffic Engineering (RSVP-TE)", IETF, Network Working Group, Feb. 2006, pp. 1-20.

Mannie, E., Request for Comments 3945, "Generalized Multi-Protocol Label Switching (GMPLS) Architecture", IETF, Network Working Group, Oct. 2004, pp. 1-65.

Mannie, E., Request for Comments 3946, "Generalized Multi-Protocol Label Switching (GMPLS) Extensions for Synchronous Optical Network (SONET) and Synchronous Digital Hierarchy (SDH) Control", IETF, Network Working Group, Oct. 2004, pp. 1-25.

U.S. Appl. No. 11/589,600, entitled Dynamically and Efficiently Forming Hierarchical Tunnels, by Vasseur et al., on Oct. 30, 2006, 33 pgs.

* cited by examiner

PROTECTION OF HIERARCHICAL TUNNEL HEAD-END NODES

TECHNICAL FIELD

The present disclosure relates generally to computer networks, and, more particularly, to protecting hierarchical tunnel head-end nodes within the computer networks.

BACKGROUND

Hierarchical tunnels, e.g., label switched paths (LSPs), have been used to improve the scalability of tunneling networks, for example Multi-Protocol Label Switching (MPLS) Traffic Engineering (TE) networks. For instance, as the number of nodes and tunnels increases within a network, signaling burdens (tunnel set up/reroute/tear down/resize), resource consumption (e.g., memory), and state maintenance (e.g., refresh, etc.) become increasingly complex and taxing, particularly within network cores. The use of hierarchical tunnels, however, allows a plurality of tunnels (child tunnels, or "cLSPs") that traverse a shared path segment (e.g., and have the same or compatible attributes/affinities) to be further encapsulated onto a single hierarchical tunnel (parent tunnel or "hLSP"), which may be less complex and less burdensome to maintain than the plurality of child tunnels.

While hierarchical tunnels offer various benefits that will be understood by those skilled in the art, various technical challenges are also presented with their use. For instance, protecting one or more child tunnels against failure of a head-end node of an associated hierarchical tunnel, e.g., such as for "Fast Reroute" (FRR), is currently inefficient and cumbersome. That is, a backup tunnel originating from a child tunnel would generally enter a hierarchical tunnel at "mid-tunnel" with an improper tunnel header (e.g., a label and/or label stack) primarily because the point of local repair (PLR) upstream of the hierarchical tunnel head-end node is on the child tunnel, while the merge point downstream of the hierarchical tunnel head-end node is on the hierarchical tunnel, as will be understood by those skilled in the art. One solution consists of setting up backup tunnels from each upstream node of the hierarchical tunnel head-end node to the tail-end node of the hierarchical tunnel, thus bypassing the hierarchical tunnel (e.g., due to required path diversity from the hierarchical tunnel). As a result, the general length of backup tunnels through the network is increased, and more of the network is traversed by tunnels thus increasing the number of tunnels per-node in the network. This may be considered a substantial waste of resources, and thus, the motivation for hierarchical tunnels is greatly reduced.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
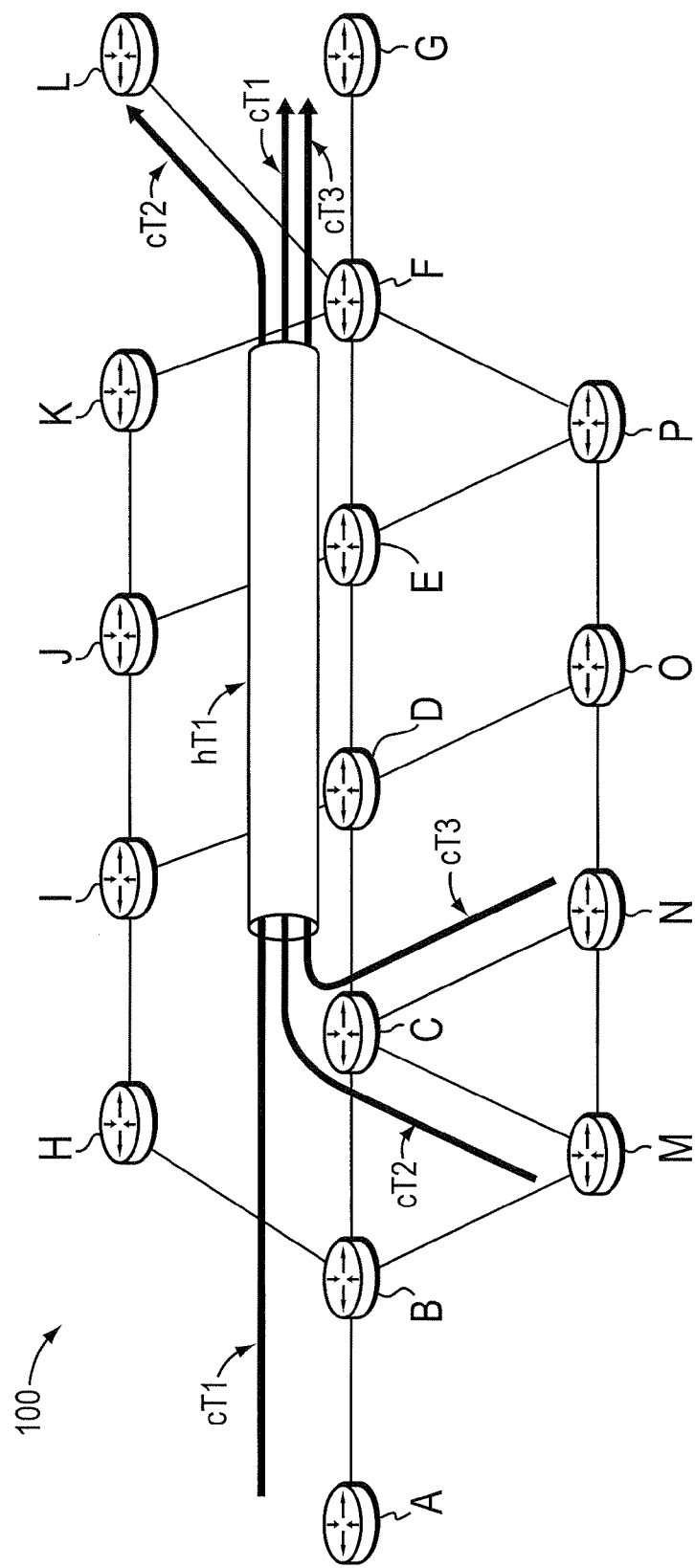
FIG. 1 illustrates a schematic block diagram of an example computer network.

According to embodiments of the disclosure, a point of local repair (PLR) for a child tunnel establishes a backup tunnel to a hierarchical tunnel head-end node's (grooming node's) downstream hierarchical tunnel neighbor (merge point) and learns a corresponding backup tunnel label. The PLR then creates and stores a label stack having at least i) the backup tunnel label, ii) a hierarchical tunnel label for the merge point, and iii) a child tunnel label as advertised by a hierarchical tunnel tail-end node. In response to detecting a failure of the hierarchical tunnel head-end node, the PLR pushes the stored label stack onto traffic for the child tunnel, and reroutes the traffic with the pushed label stack onto the backup tunnel toward the merge point (e.g., so the merge point may receive the traffic with a proper/expected label stack). Also, the PLR may forward Path messages for the hierarchical tunnel and child tunnel onto the backup tunnel to maintain the states of the hierarchical tunnel and child tunnel accordingly.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain," and a router that interconnects different domains is generally referred to as a "border router."

FIG. 1 is a schematic block diagram of an exemplary computer network 100 illustratively comprising nodes (e.g., routers) A-P interconnected by links as shown. Those skilled in the art will understand that any number of nodes, routers, links, etc. may be used in the computer network, and that the view shown herein is for simplicity. Those skilled in the art will also understand that while the present invention is described generally, it may apply to a provider core network with provider (P) and provider edge (PE) routers, any network configuration within an AS or area, or throughout multiple ASes or areas, etc.

Data packets may be exchanged among the nodes of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc.

Figure 2:
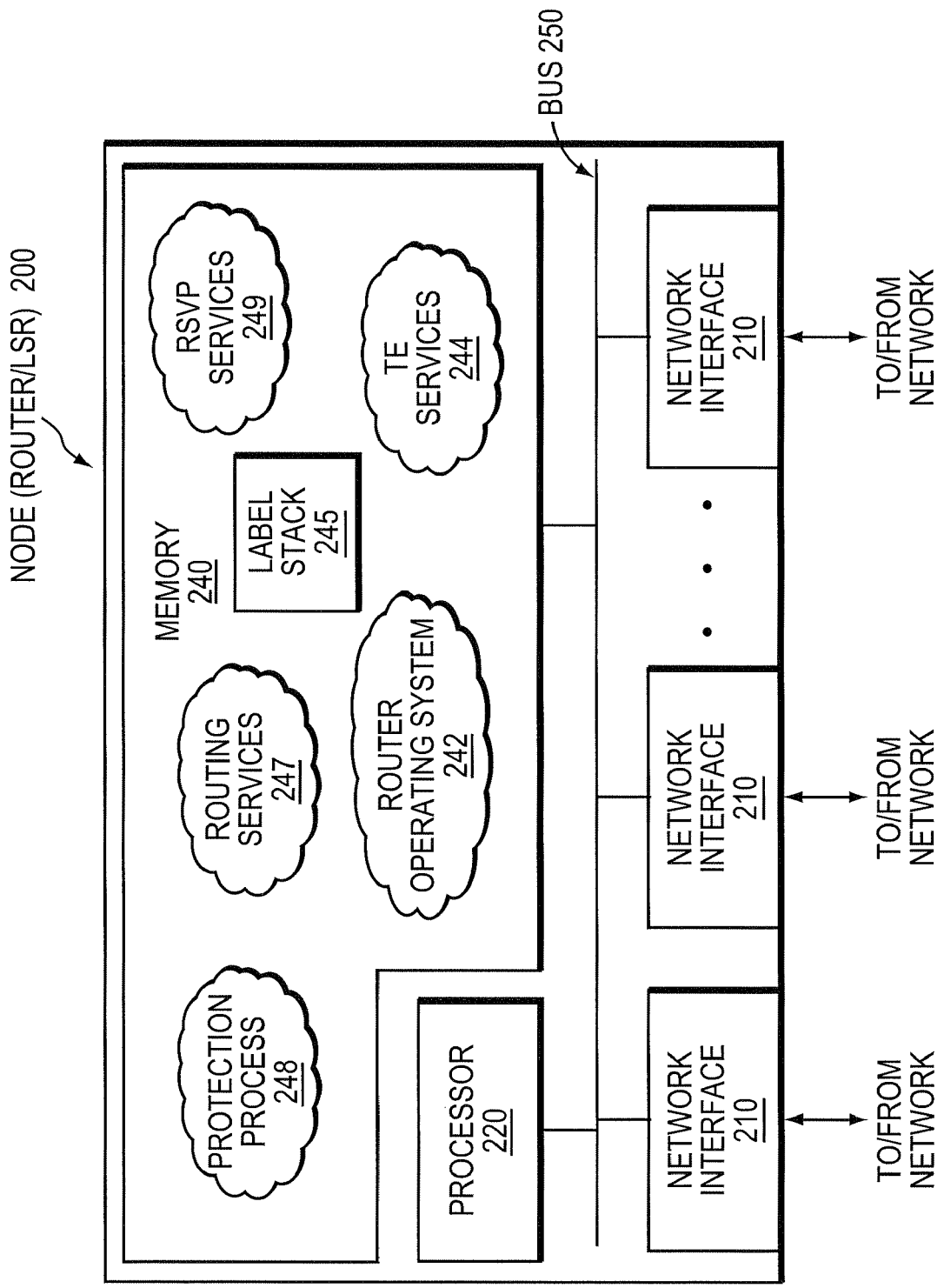
FIG. 2 illustrates a schematic block diagram of an example network device/router.

FIG. 2 is a schematic block diagram of an exemplary node/router 200 that may be advantageously used with one or more embodiments described herein, e.g., as a label switched router (LSR). The node comprises a plurality of network interfaces 210, one or more processors 220, and a memory 240 interconnected by a system bus 250. The network interfaces 210 contain the mechanical, electrical and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

The memory 240 comprises a plurality of storage locations that are addressable by each processor 220 and the network interfaces 210 for storing software programs and data structures associated with the present invention. The processors 220 may comprise necessary elements or logic adapted to execute the software programs and manipulate the data structures, such as stored label stacks 245. An operating system 242 (e.g., the Internetworking Operating System, or IOS™, of Cisco Systems, Inc.), portions of which are typically resident in memory 240 and executed by the processor, functionally organizes the node by, inter alia, invoking network operations in support of software processes and/or services executing on the node. These software processes and/or services may comprise routing services 247, Resource ReSerVation Protocol (RSVP) services 249, Traffic Engineering (TE) services 244, and an example protection process/services 248 for performing protection techniques as described herein. It will be apparent to those skilled in the art that other processor and memory means, including various computer-readable media, may be used to store and execute program instructions pertaining to the inventive technique described herein.

Routing services 247 contain computer executable instructions executed by processor(s) 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database (not shown) containing, e.g., data used to make forwarding decisions. In particular, changes in the network topology may be communicated among routers 200 using IGP services, such as the conventional OSPF and IS-IS link-state protocols. Suppose, for example, that a communication link fails or a cost value associated with a network node changes. Once the change in the network's state is detected by one of the routers, that router may flood an IGP advertisement/message communicating the change to the other routers in the network. In this manner, each of the routers eventually "converges" to an identical view of the network topology. Notably, routing services 247 may also perform functions related to virtual routing protocols, such as maintaining VRF instances (not shown) as will be understood by those skilled in the art.

Multi-Protocol Label Switching (MPLS) Traffic Engineering has been developed to meet data networking requirements such as guaranteed available bandwidth or fast restoration. MPLS Traffic Engineering exploits modern label switching techniques to build end-to-end tunnels based on a series of constraints through an IP/MPLS network of label switched routers (LSRs). These tunnels are a type of label switched path (LSP) and thus are generally referred to as MPLS Traffic Engineering (TE) LSPs. Examples of MPLS TE can be found in RFC 3209, entitled *RSVP-TE: Extensions to RSVP for LSP Tunnels* dated December 2001, RFC 3784 entitled *Intermediate-System-to-Intermediate-System (IS-IS) Extensions for Traffic Engineering (TE)* dated June 2004, and RFC 3630, entitled *Traffic Engineering (TE) Extensions to OSPF Version 2* dated September 2003, the contents of all of which are hereby incorporated by reference in their entirety.

Establishment of an MPLS TE-LSP from a head-end LSR to a tail-end LSR involves computation of a path through a network of LSRs. Optimally, the computed path is the "shortest" path, as measured in some metric, that satisfies all relevant LSP Traffic Engineering constraints or "attributes," such as e.g., required bandwidth, "affinities" (administrative constraints to avoid or include certain links), priority, class type, etc. Path computation can either be performed by the head-end LSR or by some other entity operating as a path computation element (PCE) not co-located on the head-end LSR. The head-end LSR (or a PCE) exploits its knowledge of network topology and resources available on each link to perform the path computation according to the LSP Traffic Engineering constraints. Various path computation methodologies are available including CSPF (constrained shortest path first). MPLS TE-LSPs can be configured within a single domain, e.g., area, level, or AS, or may also span multiple domains, e.g., areas, levels, or ASes.

Some applications may incorporate unidirectional data flows configured to transfer time-sensitive traffic from a source (sender) in a computer network to a destination (receiver) in the network in accordance with a certain "quality of service" (QoS). Here, network resources may be reserved for the unidirectional flow to ensure that the QoS associated with the data flow is maintained. The Resource ReSerVation Protocol (RSVP) is a network-control protocol that enables applications to reserve resources in order to obtain special QoS for their data flows. RSVP works in conjunction with routing protocols to, e.g., reserve resources for a data flow in a computer network in order to establish a level of QoS required by the data flow. RSVP is defined in R. Braden, et al., *Resource ReSerVation Protocol (RSVP)*, RFC 2205, the contents of which are hereby incorporated by reference in their entirety. In the case of traffic engineering applications, RSVP signaling is used to establish a TE-LSP and to convey various TE-LSP attributes to routers, such as border routers, along the TE-LSP obeying the set of required constraints whose path may have been computed by various means.

Generally, a tunnel is a logical structure that encapsulates a packet (a header and data) of one protocol inside a data field of another protocol packet with a new header. In this manner, the encapsulated data may be transmitted through networks that it would otherwise not be capable of traversing. More importantly, a tunnel creates a transparent virtual network link between two network nodes that is generally unaffected by physical network links or devices (i.e., the physical network links or devices merely forward the encapsulated packet based on the new header). While one example of a tunnel is an MPLS TE-LSP, other known tunneling methods include, inter alia, the Layer Two Tunnel Protocol (L2TP), the Point-to-Point Tunneling Protocol (PPTP), and IP tunnels.

A common practice in TE-enabled networks consists of deploying a mesh of TE-LSPs between a plurality of edge devices (provider edge, or PE routers) through a core network of fewer (generally large capacity) routers (provider, or P routers). In a mesh between PE routers (e.g., a "full mesh"), each PE router on one side of the core is connected to each PE router on the other side of the core via one or more TE-LSPs. The mesh of TE-LSPs provides various benefits within the network, as known to those skilled in the art, such as for providing redundancy to nodes connected to more than one PE router.

In one embodiment, the routers described herein are IP routers that implement Multi-Protocol Label Switching (MPLS) and operate as label switched routers (LSRs). In one simple MPLS scenario, at an ingress to a network, a label is assigned to each incoming packet based on its forwarding equivalence class before forwarding the packet to a next-hop router. At each router, a forwarding selection and a new substitute label are determined by using the label found in the incoming packet as a reference to a label forwarding table that includes this information. At the network egress, a forwarding decision is made based on the incoming label but optionally no label is included when the packet is sent on to the next hop.

The paths taken by packets that traverse the network in this manner are referred to as label switched paths (LSPs) or Traffic Engineering (TE)-LSPs. Establishment of a TE-LSP requires computation of a path, signaling along the path, and modification of forwarding tables along the path. MPLS TE establishes LSPs that have guaranteed bandwidth under certain conditions. Illustratively, the TE-LSPs may be signaled through the use of the RSVP protocol (with Traffic Engineering extensions), and in particular, RSVP TE signaling messages. Notably, when incorporating the use of PCEs, the path computation request (and response) between PCC and PCE can be exchanged in accordance with a protocol specified in Vasseur, et al., *Path Computation Element (PCE) Communication Protocol (PCEP)*—Version 1—<draft-ietf-pce-pcep-04.txt>, Internet Draft, December 2006, the contents of which are hereby incorporated by reference in their entirety. It should be understood that the use of RSVP or PCEP serves only as an example, and that other communication protocols may be used in accordance with the present invention.

RSVP services 249 contain computer executable instructions for implementing RSVP and processing RSVP messages in accordance with the present invention. RSVP is described in RFC 2205, entitled *Resource ReSerVation Protocol (RSVP)*, and in RFC 3209, entitled *RSVP-TE: Extensions to RSVP for LSP Tunnels*, both as incorporated above.

TE services 244 contain computer executable instructions for implementing TE functions in accordance with the present invention. Examples of Traffic Engineering are described in RFC 3209, RFC 3784, and RFC 3630 as incorporated above, and in RFC 3473, entitled, *Generalized Multi-Protocol Label Switching (GMPLS) Signaling Resource ReSerVation Protocol-Traffic Engineering (RSVP-TE) Extensions* dated January 2003, which is hereby incorporated by reference in its entirety. A TE database (TED, not shown) may be illustratively resident in memory 240 and used to store TE information provided by the routing protocols, such as IGP, BGP, and/or RSVP (e.g., with TE extensions as described herein). The TED may be illustratively maintained and managed by TE services 244.

In accordance with RSVP, to request a data flow (TE-LSP) between a sender (head-end node) and a receiver (tail-end node), the sender may send an RSVP path request (Path) message downstream to the receiver along a path (e.g., a unicast route) to identify the sender and indicate e.g., bandwidth needed to accommodate the data flow, along with other attributes of the TE-LSP. The Path message may contain various information about the data flow including, e.g., traffic characteristics of the data flow, as well as an explicit route object (ERO), indicating a hop-by-hop path over which the message should traverse (or, notably, loose hops, etc., as will be understood by those skilled in the art). Also in accordance with RSVP, a receiver establishes the TE-LSP between the sender and receiver by responding to the sender's Path message with a reservation request (Resv) message. The reservation request message travels upstream hop-by-hop along the path from the receiver to the sender. The reservation request message contains information that is used by intermediate nodes along the path to reserve resources for the data flow between the sender and the receiver, to confirm the attributes of the TE-LSP, and provide a TE-LSP label. If an intermediate node in the path between the sender and receiver acquires a Path message or Resv message for a new or established reservation (TE-LSP) and encounters an error (e.g., insufficient resources, failed network element, etc.), the intermediate node generates and forwards a path or reservation error (PathErr or ResvErr, hereinafter Error) message to the sender or receiver, respectively.

Figure 3:
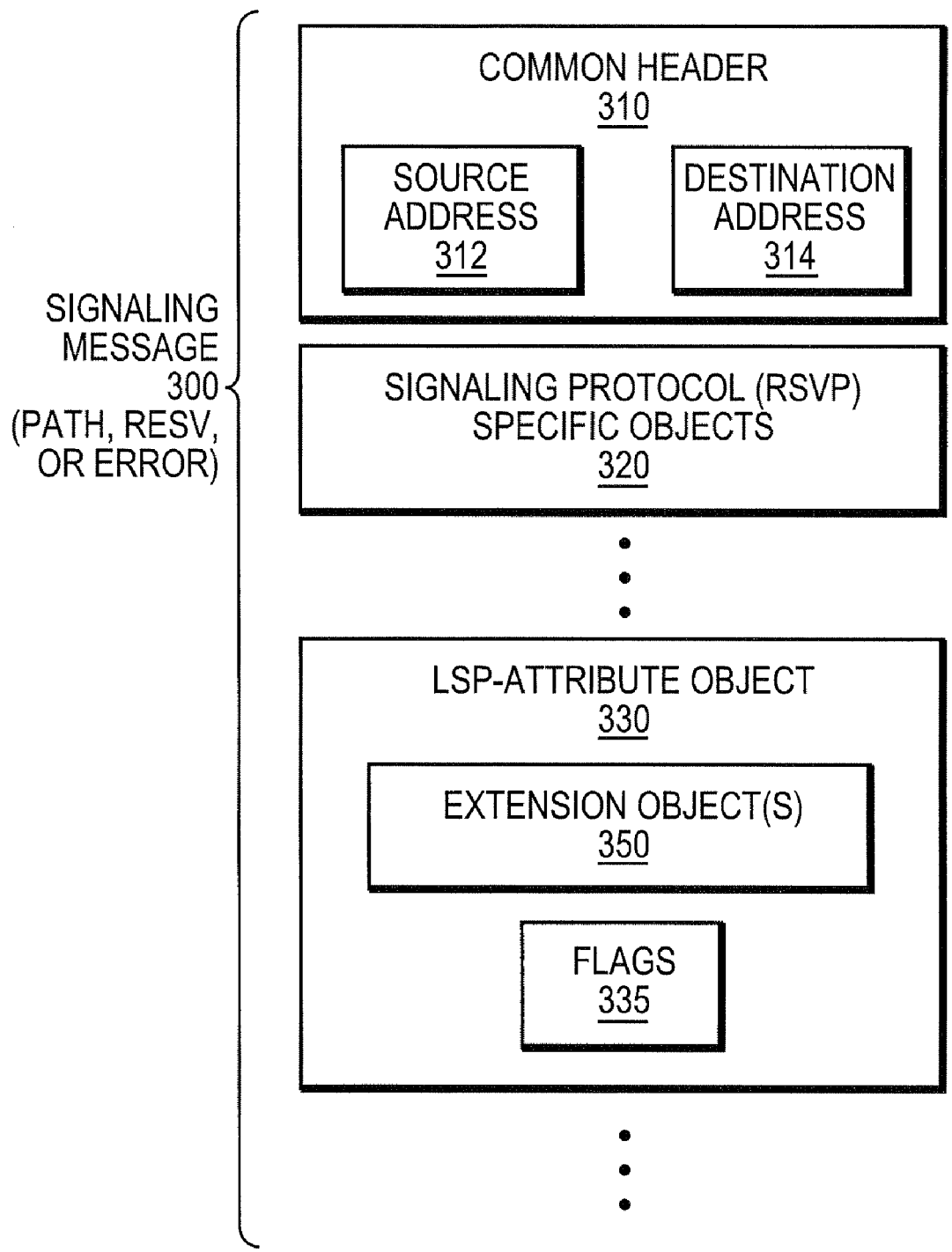
FIG. 3 illustrates a schematic block diagram of portions of a signaling message.

FIG. 3 is a schematic block diagram of portions of a signaling message 300 (e.g., RSVP message, such as Path, Resv, or Error) that may be advantageously used with the present invention. Message 300 contains, inter alia, a common header 310 and one or more signaling protocol specific objects 320, such as an LSP-ATTRIBUTE object 330 and any extension objects 350, as described herein. The common header 310 may comprise a source address 312 and destination address 314, denoting the origination and requested termination of the message 300. Protocol specific objects 320 contain objects necessary for each type of message 300 (e.g., Path, Resv, Error, etc.). For instance, a Path message may have a sender template object, Tspec object, Previous-hop object, ERO, etc. The LSP-ATTRIBUTE object 330, for instance, may be used to signal attributes and/or information regarding an LSP (tunnel). To communicate this information, LSP-ATTRIBUTE object 330 (as well as specific objects 320) may include various type/length/value (TLV) encoding formats and/or flags, as will be understood by those skilled in the art. An example of an LSP-ATTRIBUTE object is further described in RFC 4420, entitled *Encoding of Attributes for Multiprotocol Label Switching (MPLS) Label Switched Path (LSP) Establishment Using Resource ReserVation Protocol-Traffic Engineering (RSVP-TE)* dated February 2006, which is hereby incorporated by reference as though fully set forth herein. A Resv message, on the other hand, may have specific objects 320 for a label object, session object, filter spec object, etc., in addition to the LSP-ATTRIBUTE object 330.

Error messages 300 (e.g., PathErr or ResvErr), may also have specific objects 320, such as for defining the type of error, etc.

It should be noted that in accordance with RSVP signaling, the state of the TE-LSP is refreshed on a timed interval, e.g., every thirty seconds, in which RSVP Path and Resv messages are exchanged. This timed interval is configurable by a system administrator. Moreover, various methods understood by those skilled in the art may be utilized to protect against route record objects (RROs) contained in signaling messages for a TE-LSP in the event security/privacy is desired. Such RRO filtering prevents a head-end node of the TE-LSP from learning of the nodes along the TE-LSP, i.e., nodes within the provider network.

Although the illustrative embodiment described herein is directed to MPLS, it should also be noted that the present invention may advantageously apply to Generalized MPLS (GMPLS), which pertains not only to packet and cell-based networks, but also to Time Division Multiplexed (TDM) and optical networks. GMPLS is well known and described in RFC 3945, entitled *Generalized Multi-Protocol Label Switching (GMPLS) Architecture*, dated October 2004, and RFC 3946, entitled *Generalized Multi-Protocol Label Switching (GMPLS) Extensions for Synchronous Optical Network (SONET) and Synchronous Digital Hierarchy (SDH) Control*, dated October 2004, the contents of both of which are hereby incorporated by reference in their entirety.

As mentioned above, hierarchical tunnels (e.g., parent tunnels or "hLSPs") allow a plurality of child tunnels (e.g., "cLSPs") that traverses a shared path segment (e.g., and have the same or compatible attributes/affinities) to be further encapsulated onto a single hierarchical tunnel. For example, referring again to FIG. 1, a plurality of child tunnels is shown as thin lines originating at head-end nodes A, M, and N, and terminating at tail-end nodes G, L, and G, respectively. For instance, a first child tunnel from node A to node G may be denoted "cT1", while the child tunnels from node M to node L and from node N to node G may be correspondingly denoted "cT2" and "cT3". As will be appreciated by those skilled in the art, each of the child tunnels cT1-cT3 shares a path segment through the network, particularly, nodes C-F. Assuming illustratively that the child tunnels cT1-cT3 share appropriate characteristics, a hierarchical tunnel "hT1" may be established, e.g., manually or dynamically, from head-end node C to tail-end node F. Dynamic establishment of hierarchical tunnels is described in commonly owned, copending U.S. patent application Ser. No. 11/589,600, entitled, DYNAMICALLY AND EFFICIENTLY FORMING HIERARCHICAL TUNNELS, filed by Vasseur et al. on Oct. 30, 2006, the contents of which are hereby incorporated by reference in their entirety.

Also as mentioned above, protecting one or more child tunnels against failure of a head-end node of an associated hierarchical tunnel (e.g., such as for "Fast Reroute" or "FRR") is currently inefficient and cumbersome. That is, a backup tunnel originating from a child tunnel would generally enter a hierarchical tunnel at mid-tunnel with an improper tunnel header (e.g., a label and/or label stack) primarily because the point of local repair (PLR) upstream of the hierarchical tunnel head-end node is on the child tunnel, while the merge point downstream of the hierarchical tunnel head-end node is on the hierarchical tunnel, as will be understood by those skilled in the art. (For this reason, this type of backup tunnel is not currently supported by conventional FRR techniques.) In addition, the state of the tunnels may be improperly handled (e.g., receiving a child tunnel state refresh message on a hierarchical tunnel intermediate node), etc.

A current solution known to those skilled in the art as mentioned above would be to establish backup tunnels (not shown) for each child tunnel that does not intersect the hierarchical tunnel. For instance, cT1 may have a backup tunnel from the PLR node B that traverses nodes H-J, and ends on the tail-end node F of the hierarchical tunnel (i.e., the "reappearance" of the child tunnel cT1 from the hierarchical tunnel). A similar backup tunnel along the nodes shown at the bottom of network 100 may be used for hierarchical tunnel head-end node protection for each of cT2 and cT3. These lengthy backup tunnels that substantially bypass the hierarchical tunnel, however, are generally cumbersome and inefficient, assuming that a path not intersecting the hierarchical tunnel is even found in the network 100.

Protecting Against Hierarchical Tunnel Head-End Node Failure

According to embodiments of the disclosure, a point of local repair (PLR) for a child tunnel establishes a backup tunnel to a hierarchical tunnel head-end node's (grooming node's) downstream hierarchical tunnel neighbor (merge point) and learns a corresponding backup tunnel label. The PLR then creates and stores a label stack having at least i) the backup tunnel label, ii) a hierarchical tunnel label for the merge point, and iii) a child tunnel label as advertised by a hierarchical tunnel tail-end node. In response to detecting a failure of the grooming node, the PLR pushes the stored label stack onto traffic for the child tunnel, and reroutes the traffic with the pushed label stack onto the backup tunnel toward the merge point (e.g., so the merge point may receive the traffic with a proper/expected label stack). Also, the PLR may forward Path messages for the hierarchical tunnel and child tunnel onto the backup tunnel to maintain the states of the hierarchical tunnel and child tunnel accordingly.

Operationally, a new signaling object may be defined for use with hierarchical tunnel head-end node protection (an "HH-PROT" object) for a particular child tunnel. Illustratively, the new object is an extended object 350 of an RSVP Resv message 300, for example, within the LSP-ATTRIBUTE object 330 (as shown). This new HH-PROT object 350 may be generated by the grooming node C (which is configured for head-end node protection), and may comprise a plurality of sub-objects/fields (not specifically shown). In particular, the sub-objects may comprise: 1) a hierarchical tunnel label (e.g., "h2") as advertised by the merge point (node D) for the hierarchical tunnel (hT1) pertaining to the particular child tunnel (e.g., cT1); 2) identification (e.g., a Router ID) of the merge point; and 3) a copy of the Path message 300 sent by the grooming node to the merge point to refresh the state of the hierarchical tunnel. The grooming node C may generate a Resv message 300 having the HH-PROT object 350, and may send the message 300 to its upstream neighbor, the PLR node B.

In addition to the above information (such as learned from the Resv message 300 or other means, e.g., manually), the PLR may also learn the child tunnel label (e.g., "c1") as used by the hierarchical tunnel tail-end node F for the particular child tunnel cT1. For example, as will be appreciated by those skilled in the art, the child tunnel label may be learned through conventional node protection mechanisms, since the next-next-hop (i.e., the next downstream neighbor of the child tunnel) from the PLR is the tail-end node of the hierarchical tunnel. (That is, the child tunnel hop-by-hop configuration with a hierarchical tunnel appears as A, B, C, F, and G, with C, D, E, and F forming the hierarchical tunnel.) Therefore, learning the next-next-hop label at the PLR produces the child tunnel label as used by the tail-end node of the hierarchical tunnel.

Figure 4:
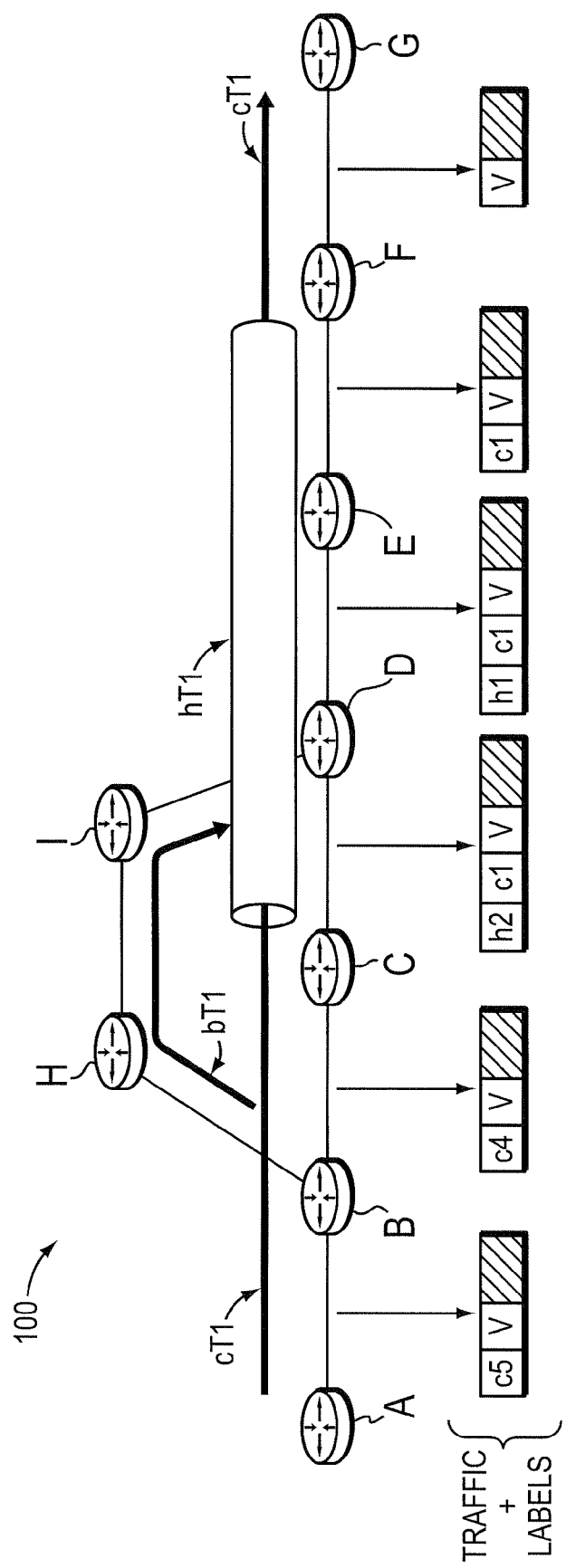
FIG. 4 illustrates a schematic block diagram of an example backup tunnel for protecting a hierarchical tunnel head-end node.

In accordance with one or more embodiments herein, the PLR (node B) may establish a backup tunnel (e.g., "bT1") from itself to the merge point (node D), and learn a corresponding backup tunnel label (e.g., "b1") to use for the backup tunnel. FIG. 4 illustrates a schematic block diagram of an example backup tunnel (bT1) for protecting a hierarchical tunnel head-end node, e.g., in a simplified network 100 from FIG. 1. The establishment of the backup tunnel may be in response to manual configuration, or, illustratively, in response to the PLR receiving the HH-PROT object 350 above from the grooming node (e.g., where the grooming node is configured for node protection). Also, the backup tunnel may be established in response to the particular child tunnel (cT1) being signaled with "local protection desired", e.g., within a SESSION-ATTRIBUTE object (e.g., a specific object 320). Note that while the examples described herein establish a backup tunnel between the immediate upstream and downstream nodes from the grooming node, other nodes along the child tunnel and hierarchical tunnel may be used as the PLR and merge point, respectively.

Illustratively, in FIG. 4, the child tunnel cT1 traverses nodes A-G, and is encapsulated within a hierarchical tunnel hT1 extending from nodes C-F, as described above. Traffic (e.g., packets) from the head-end node A of the child tunnel may be forwarded (switched) toward the downstream neighbor with a child tunnel label ("c5"), and optionally other labels, such as a VPN label ("V"), as shown. Upon receiving the traffic, each intermediate node along the child tunnel may continue to forward the traffic with a new label as advertised by the downstream neighbor to next receive the traffic as will be understood by those skilled in the art. Once the hierarchical tunnel head-end node (grooming node) is reached, the corresponding hierarchical tunnel label (e.g., "h2") is pushed onto the label stack of the traffic, in front of the child tunnel label expected by the tail-end node of the hierarchical tunnel (e.g., "c1"). Hierarchical tunnel labels are then switched up to the tail-end node, which then removes (pops) the hierarchical tunnel label, and forwards the traffic based on the remaining child tunnel label. Note that no label need be included for the last hop of the tunnels due to penultimate hop popping, "PHP", as will be understood by those skilled in the art.

The backup tunnel bT1 may be established from the PLR node B, through example nodes H and I, and returning to the hierarchical tunnel beyond (downstream from) the protected grooming node C at the merge point, node D. Through conventional tunnel signaling, the PLR learns the backup tunnel label expected by its backup tunnel downstream neighbor (node H). In the event a backup tunnel has previously been established from the PLR to the merge point (e.g., for another child tunnel sharing the same PLR and merge point for the same grooming node), the PLR may use the previously established backup tunnel for the particular child tunnel cT1.

Once the PLR learns the information described in the HH-PROT object 350 above, and once the backup tunnel is established having a backup tunnel label, the PLR may create and store an appropriate label stack for the protection of the grooming node in memory 240 (e.g., in an FRR Database, not shown). In particular, the stored label stack 245 has at least i) the backup tunnel label (b2) for the backup tunnel (bT1), ii) a hierarchical tunnel label (h2) for the merge point (node D) on the hierarchical tunnel (hT1), and iii) a child tunnel label (c1) as advertised by a hierarchical tunnel tail-end node (node F) for the child tunnel (cT1).

Figure 5:
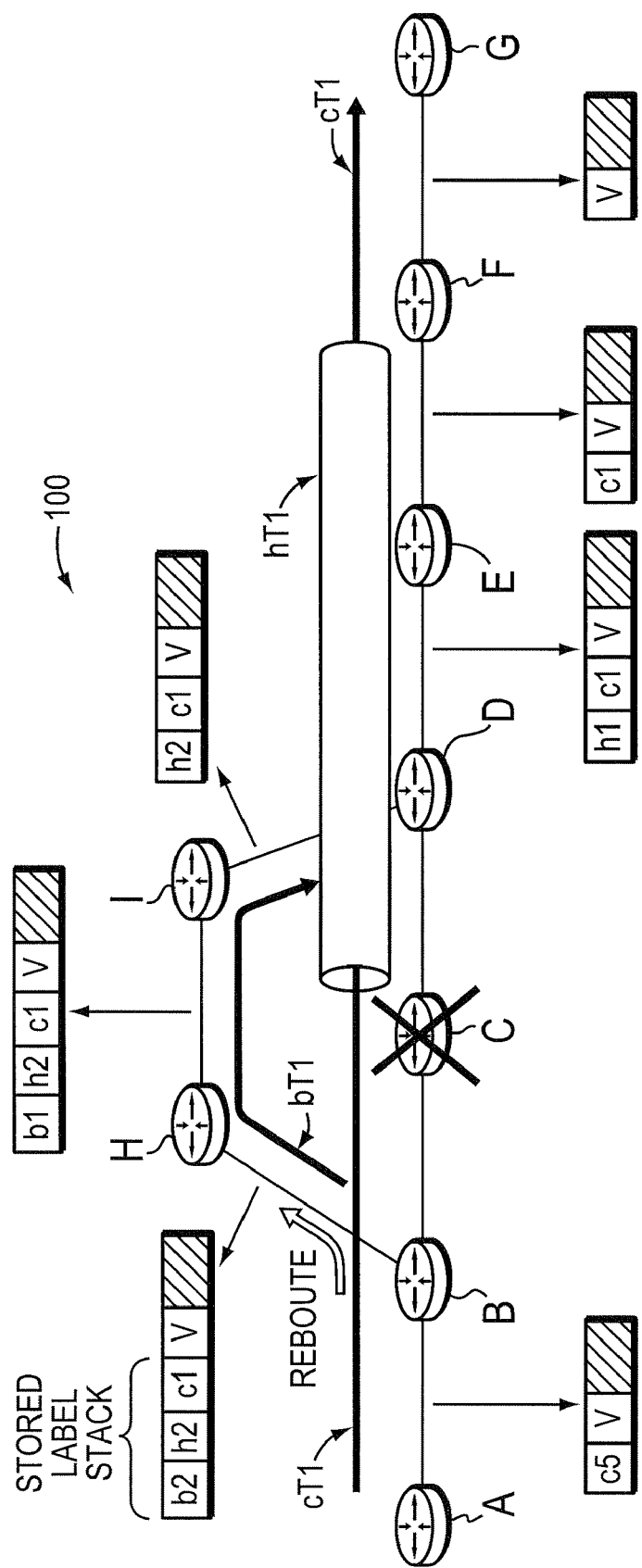
FIG. 5 illustrates a schematic block diagram of an example use of the backup tunnel in FIG. 4.

Once the backup tunnel bT1 is established, the label stack 245 is stored and the appropriate Path messages 300 are also stored, the PLR (node B) monitors for failure of the grooming node C (e.g., by using conventional techniques, such as IGP, BFD, etc., as will be understood by those skilled in the art). FIG. 5 illustrates a schematic block diagram of an example use of the backup tunnel in FIG. 4. In response to failure of the grooming node C (as indicated by the overlaid "X"), the PLR begins pushing the stored label stack 245 (e.g., b2:h2:c1, as shown) onto traffic for the child tunnel cT1 (and other protected tunnels). Those skilled in the art will appreciate that this three-label stack (for the backup, hierarchical, and child tunnels) is different from the conventional two-label stack (for the backup and protected tunnels) of traditional FRR. Note that other labels, such as VPN label V, may also be included with the traffic and that the stored label stack 245 may be pushed onto that traffic regardless of other labels/headers/etc. contained within the traffic.

By rerouting the traffic with the pushed label stack onto the backup tunnel bT1, the merge point (node D) may eventually receive the rerouted traffic. As can be seen, the backup tunnel label has been removed from the stack, leaving the hierarchical tunnel label (h2) as expected by the merge point and the child tunnel label (c1) as expected by the hierarchical tunnel tail-end node (i.e., the label that the grooming node would push onto the child tunnel traffic encapsulated into the hierarchical tunnel). In this manner, the traffic may continue to be forwarded (switched) to the tail-end node of the child tunnel cT1 in a conventional manner.

In addition to rerouting of the child tunnel traffic with the pushed label stack 245, the states of the child tunnel and hierarchical tunnel may need to be maintained. Accordingly, the PLR may forward a Path message 300 for the hierarchical tunnel (corresponding to what the grooming node would have sent as learned above) onto the backup tunnel with the backup tunnel label. That is, the merge point expects the Path message 300 as learned by the PLR, so a backup tunnel is applied for forwarding along the backup tunnel. Upon receiving the Path message, the merge point refreshes the state of the hierarchical tunnel, thus maintaining its state. Notably, because multiple source PLRs may each send Path messages for the hierarchical tunnel to the merge point (not shown), the merge point may be configured to receive the multiple Path messages (e.g., as a multipoint-to-point, or MP2P tunnel merge point) and respond appropriately. For instance, the merge point may otherwise consider the multiple Path messages as a Denial of Service (DoS) attack, as will be appreciated by those skilled in the art.

Further, to refresh/maintain the state of the child tunnel, the PLR may forward a Path message 300 for the child tunnel as it would normally (that is, prior to failure of the grooming node), but now along the backup tunnel with the stored label stack 245 described above. The hierarchical tunnel tail-end node receives the rerouted Path message 300 for the child tunnel, along with the traffic for the child tunnel, and thus refreshes the state of the child tunnel and forwards the Path message downstream along the child tunnel accordingly.

Note also that the PLR may generate a Path Error message 300 indicating that the grooming node has failed, and may send the Path Error message to the head-end node of the child tunnel (e.g., node A). The Path Error message 300 may simply indicate a path failure, or, illustratively, may have a particular type/code indicating a grooming node failure, e.g., for informational purposes or otherwise (e.g., directing specific action, etc.).

Figure 6:
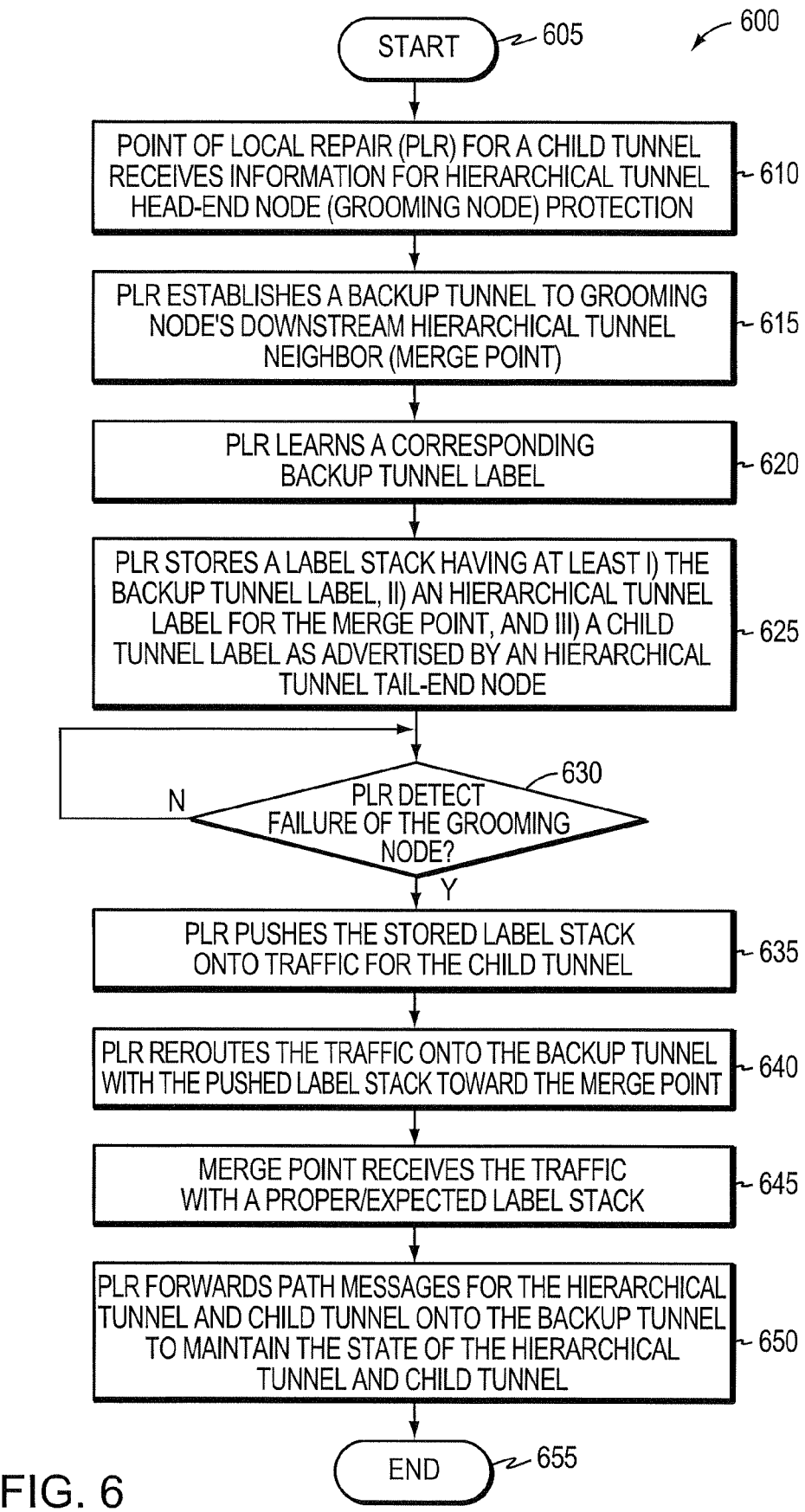
FIG. 6 illustrates an example procedure for protecting hierarchical tunnel head-end nodes.

FIG. 6 is a flowchart illustrating an example procedure for protecting hierarchical tunnel head-end nodes in accordance with one or more embodiments described herein. The procedure 600 starts at step 605, and continues to step 610, where a PLR (e.g., node B) for a child tunnel (e.g., cT1) receives information for hierarchical tunnel head-end node (grooming node, e.g., node C) protection. As mentioned above, such information may comprise the merge point, the hierarchical tunnel label expected by the merge point, the Path message 300 sent by the grooming node, the child tunnel label expected by the hierarchical tunnel tail-end node, etc. In step 615, the PLR establishes a backup tunnel (e.g., bT1) to the grooming node's downstream hierarchical tunnel neighbor (merge point, e.g., node D), and leans a corresponding backup tunnel label (e.g., "b2") in step 620. Notably, in one or more embodiments, step 615 may be performed in response to step 610, or independently, as described above. With the learned/obtained information, the PLR creates and stores a label stack 245 in step 625 that has at least i) the backup tunnel label ("b2"), ii) a hierarchical tunnel label for the merge point ("h2"), and iii) a child tunnel label as advertised by an hierarchical tunnel tail-end node ("c1"), e.g., b2:h2:c1.

Upon detecting failure of the grooming node in step 630 (e.g., BFD, IGP, etc.), the PLR pushes the stored label stack onto traffic received for the child tunnel cT1 in step 635, and in step 640 reroutes the traffic with the pushed label stack (b2:h2:c1) onto the backup tunnel bT1 toward the merge point, node D. The merge point receives the traffic in step 645 with a proper/expected label stack (e.g., h2:c1, with the backup tunnel label removed). As described above, with an expected label stack, the rerouted traffic continues in a conventional manner from the merge point (i.e., along the hierarchical tunnel to continue onto the original child tunnel). Also as described above, in step 650, the PLR forwards Path messages 300 for the hierarchical tunnel hT1 and child tunnel cT1 onto the backup tunnel bT1 to maintain the states of the hierarchical tunnel and child tunnel. That is, the hierarchical tunnel Path message generally sent by the grooming node (as learned above) is generated and sent onto the backup tunnel with the backup tunnel label pushed before the hierarchical tunnel (b2:h2) to be received and handled by the merge point. Conversely, the child tunnel Path message with the stored label stack (b2:h2:c1) is rerouted onto the backup tunnel. The sequence 600 ends in step 655, with traffic rerouted onto the backup tunnel until no longer necessary as mentioned above.

Advantageously, the novel embodiments described herein protect hierarchical tunnel head-end nodes in a computer network. By providing the protocol extensions and techniques described above, the novel embodiments protect child tunnels from failure of a grooming node with a backup tunnel from the protected grooming node's upstream neighbor (the PLR) to its downstream neighbor (the merge point), i.e., a "next-next-hop tunnel". Accordingly, the use of next-next-hop backup tunnels to protect hierarchical tunnel head-end nodes reduces the number and length of backup tunnels in the network and the associated resource (e.g., bandwidth) that may be required. Also, the dynamic aspects of one or more embodiments described herein alleviate the need for cumbersome and inefficient manual configuration.

While there have been shown and described illustrative embodiments that protect hierarchical tunnel head-end nodes in a computer network, it is to be understood that various other adaptations and modifications may be made within the spirit and scope of the present invention. For example, the disclosure has been shown and described herein with/using MPLS TE-LSPs. However, the embodiments of the invention in their broader sense are not so limited, and may, in fact, be used with any appropriate tunneling/encapsulation mechanism, such as IP Security (IPSec) tunnels, Point-to-Point Protocol (PPP) tunnels, Layer-2 Tunneling Protocol (L2TP) tunnels, etc., as will be understood by those skilled in the art. Also, while the above description describes utilizing RSVP messages, those skilled in the art will understand that other reservation protocols may also be used. Notably, the present invention may also be used with multiple levels of hierarchy, such that a hierarchical tunnel may be a child tunnel encapsulated into another hierarchical tunnel, etc.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
establishing a plurality of child tunnels each having a portion that spans a shared path segment;
establishing a hierarchical tunnel that encapsulates the portion of the plurality of child tunnels that spans the shared path segment;
establishing a backup tunnel from a point of local repair (PLR) for a child tunnel of the plurality of child tunnels to the hierarchical tunnel's head-end node's (grooming node's) downstream hierarchical tunnel neighbor (merge point);
learning a corresponding backup tunnel label at the PLR;
storing a label stack at the PLR having at least i) the backup tunnel label, ii) a hierarchical tunnel label for the merge point, and iii) a child tunnel label as advertised by the hierarchical tunnel's tail-end node;
detecting a failure of the grooming node;
pushing the stored label stack onto traffic for the child tunnel at the PLR in response to detecting the failure; and
rerouting the traffic with the pushed label stack onto the backup tunnel toward the merge point.

2. The method as in claim 1, further comprising:
receiving the traffic at the merge point with an expected label stack.

3. The method as in claim 1, further comprising:
forwarding a Path message with the backup tunnel label for the hierarchical tunnel from the PLR onto the backup tunnel.

4. The method as in claim 3, further comprising:
refreshing the state of the hierarchical tunnel by the merge point upon receipt of the Path message for the hierarchical tunnel.

5. The method as in claim 3, further comprising:
configuring the merge point to receive the Path message for the hierarchical tunnel from multiple source PLRs.

6. The method as in claim 3, further comprising:
learning, at the PLR, the Path message for the hierarchical tunnel.

7. The method as in claim 3, further comprising:
receiving, at the PLR, a Resv message having the Path message for the hierarchical tunnel, the message sent from the grooming node.

8. The method as in claim 1, further comprising:
forwarding a Path message with the stored label stack for the child tunnel from the PLR onto the backup tunnel.

9. The method as in claim 8, further comprising:
refreshing the state of the child tunnel by the hierarchical tunnel tail-end node upon receipt of the Path message for the child tunnel.

10. The method as in claim 1, further comprising:
determining that a previously established backup tunnel exists from the PLR to the merge point; and
using the previously established backup tunnel for the child tunnel.

11. The method as in claim 1, further comprising:
learning, at the PLR, the merge point, the hierarchical tunnel label used for the merge point, and the child tunnel label as advertised by the hierarchical tunnel tail-end node.

12. The method as in claim 11, further comprising:
learning the merge point and the hierarchical tunnel label from the grooming node.

13. The method as in claim 12, further comprising:
receiving, at the PLR, a Resv message having the merge point and the hierarchical tunnel label, the message sent from the grooming node.

14. The method as in claim 13, wherein the merge point and the hierarchical tunnel label are stored in at least one object of the Resv message configured to store at least one of the merge point and the hierarchical tunnel label.

15. The method as in claim 1, wherein the child tunnel, backup tunnel, and hierarchical tunnel are Multi-Protocol Label Switching (MPLS) Traffic Engineering Label Switched Paths (TE-LSPs).

16. The method as in claim 1, further comprising:
utilizing the Resource reSerVation Protocol (RSVP) to establish and maintain the child tunnel, backup tunnel, and hierarchical tunnel.

17. The method as in claim 1, further comprising:
performing the steps of the method of claim 1 in response to a grooming node that is configured for node protection.

18. The method as in claim 1, further comprising:
generating a Path Error message at the PLR, the Path Error message indicating that the grooming node has failed; and
sending the Path Error message toward a head-end node of the child tunnel.

19. An apparatus, comprising:
one or more network interfaces;
means for establishing a backup tunnel for a child tunnel whose traffic arrives on at least one of the one or more network interfaces, the child tunnel being one of a plurality of child tunnels that each have a portion that spans a shared path segment, wherein the portion of the plurality of child tunnels that spans the shared path segment is encapsulated by a hierarchical tunnel, the means for establishing configured to establish the backup tunnel to extend to the hierarchical tunnel's head-end node's (grooming node's) downstream hierarchical tunnel neighbor (merge point);
means for learning a corresponding backup tunnel label;
means for storing a label stack having at least i) the backup tunnel label, ii) a hierarchical tunnel label for the merge point, and iii) a child tunnel label as advertised by a hierarchical tunnel tail-end node;
means for detecting a failure of the grooming node;
means for pushing the stored label stack onto traffic for the child tunnel in response to detecting the failure; and
means for rerouting the traffic with the pushed label stack onto the backup tunnel toward the merge point.

20. A node, comprising:
one or more network interfaces adapted to receive traffic on at least one child tunnel of a plurality of child tunnels that each have a portion that spans a shared path segment, wherein the portion of the plurality of child tunnels that spans the shared path segment is encapsulated by a hierarchical tunnel;
one or more processors coupled to the network interfaces and adapted to execute one or more processes; and
a memory adapted to store a protection process executable by each processor, the protection process configured to, when executed: i) establish a backup tunnel for a child tunnel of the plurality of child tunnels to the hierarchical tunnel's head-end node's (grooming node's) downstream hierarchical tunnel neighbor (merge point); ii) learn a corresponding backup tunnel label; iii) store a label stack in the memory having at least the backup tunnel label, a hierarchical tunnel label for the merge point, and a child tunnel label as advertised by the hierarchical tunnel's tail-end node; iv) detect a failure of the grooming node; v) push the stored label stack onto the traffic for the child tunnel in response to detecting the failure; and vi) reroute the traffic with the pushed label stack onto the backup tunnel toward the merge point.

21. The apparatus as in claim 19, further comprising:
means for forwarding a Path message with the backup tunnel label for the hierarchical tunnel from the apparatus onto the backup tunnel.

22. The apparatus as in claim 19, further comprising:
means for forwarding a Path message with the stored label stack for the child tunnel from the apparatus onto the backup tunnel.

23. The node as in claim 20, wherein the protection process is further configured to, when executed, forward a Path message with the backup tunnel label for the hierarchical tunnel from the node onto the backup tunnel.

24. The node as in claim 23 wherein the protection process is further configured to, when executed, learn the Path message for the hierarchical tunnel.

25. The node as in claim 24 wherein the protection process is further configured to, when executed, receive a Resv message having the Path message for the hierarchical tunnel, sent from the grooming node.

26. The node as in claim 20 wherein the protection process is further configured to, when executed, forward a Path message with the stored label stack for the child tunnel from the node onto the backup tunnel.

27. The node as in claim 20 wherein the child tunnel, backup tunnel, and hierarchical tunnel are Multi-Protocol Label Switching (MPLS) Traffic Engineering Label Switched Paths (TE-LSPs).

* * * * *